United States Patent
James

(10) Patent No.: US 10,560,573 B2
(45) Date of Patent: Feb. 11, 2020

(54) APPARATUS AND METHOD FOR MANAGING COMMUNICATIONS

(71) Applicant: Saronikos Trading and Services, Unipessoal LDA, Funchal/Madeira (PT)

(72) Inventor: Robert James, Hatfield (GB)

(73) Assignee: Saronikos Trading and Services, Unipessoal LDA, Funchal, Madeira (PT)

( * ) Notice: Subject to any disclaimer, the term of this patent is extended or adjusted under 35 U.S.C. 154(b) by 0 days.

(21) Appl. No.: 16/064,426

(22) PCT Filed: Dec. 21, 2015

(86) PCT No.: PCT/EP2015/080728
§ 371 (c)(1),
(2) Date: Jun. 20, 2018

(87) PCT Pub. No.: WO2017/108069
PCT Pub. Date: Jun. 29, 2017

(65) Prior Publication Data
US 2019/0028586 A1    Jan. 24, 2019

(51) Int. Cl.
*H04M 3/42* (2006.01)
*H04M 1/725* (2006.01)
(Continued)

(52) U.S. Cl.
CPC ... *H04M 3/42365* (2013.01); *H04M 1/72569* (2013.01); *H04M 3/42059* (2013.01);
(Continued)

(58) Field of Classification Search
CPC ......... H04M 3/42365; H04M 3/42059; H04M 3/42348; H04M 3/436; H04M 3/42042;
(Continued)

(56) References Cited

U.S. PATENT DOCUMENTS

| 8,358,764 B1 | 1/2013 | Correa et al. |
| 8,761,363 B2 * | 6/2014 | Rajagopalan ..... H04M 3/42263 379/142.07 |

(Continued)

FOREIGN PATENT DOCUMENTS

| EP | 1819137 | 8/2007 |
| EP | 2624606 | 8/2013 |

OTHER PUBLICATIONS

International Search Report cited in PCT/EP2015/080728, dated Jul. 25, 2016. (4 pages).

*Primary Examiner* — Magdi Elhag
(74) *Attorney, Agent, or Firm* — Workman Nydegger

(57) ABSTRACT

An apparatus and a method for managing communications, wherein the apparatus includes an input component adapted to receive signaling information from a caller communication terminal that is trying to establish a connection with a called communication terminal which is unavailable, an output component adapted to send at least a non-availability message to the caller communication terminal, and a processor configured for determining attempting information on the basis of data generated by the caller communication terminal during a communication attempt, and generating, on the basis of the signaling information and the attempting information, the non-availability message or at least a configuration message allowing the communication between said caller and called communication terminals.

21 Claims, 3 Drawing Sheets

(51) Int. Cl.
*H04M 3/436* (2006.01)
*H04W 4/12* (2009.01)

(52) U.S. Cl.
CPC ....... *H04M 3/42348* (2013.01); *H04M 3/436* (2013.01); *H04M 2203/551* (2013.01); *H04W 4/12* (2013.01)

(58) Field of Classification Search
CPC ......... H04M 2250/12; H04M 1/72569; H04M 1/72563; H04M 1/72566; H04M 1/72572; H04M 3/42093; H04M 1/663
See application file for complete search history.

(56) References Cited

U.S. PATENT DOCUMENTS

| | | | | |
|---|---|---|---|---|
| 8,908,678 | B1* | 12/2014 | McGonigal | H04W 28/0268 370/352 |
| 9,553,985 | B2* | 1/2017 | Cohen | H04M 3/42059 |
| 2001/0031633 | A1* | 10/2001 | Tuomela | H04M 1/663 455/417 |
| 2002/0059527 | A1* | 5/2002 | Pedersen | H04M 3/42382 726/9 |
| 2003/0104800 | A1* | 6/2003 | Zak | G08B 25/001 455/404.1 |
| 2004/0008834 | A1* | 1/2004 | Bookstaff | H04M 3/4874 379/218.01 |
| 2004/0208301 | A1* | 10/2004 | Urban | H04L 47/10 379/142.17 |
| 2005/0277408 | A1* | 12/2005 | Stuckman | H04M 3/42 455/415 |
| 2008/0013696 | A1* | 1/2008 | Motley | H04M 3/42263 379/45 |
| 2009/0086947 | A1* | 4/2009 | Vendrow | H04M 3/02 379/201.12 |
| 2010/0166161 | A1* | 7/2010 | Dhawan | H04M 1/2478 379/88.19 |
| 2010/0304729 | A1 | 12/2010 | Sabotta et al. | |
| 2012/0002791 | A1* | 1/2012 | Kraus | A61B 5/0022 379/37 |
| 2012/0296975 | A1* | 11/2012 | Ghorbel | H04M 3/42365 709/204 |
| 2013/0243176 | A1* | 9/2013 | Martino | H04L 67/306 379/207.02 |
| 2015/0045003 | A1* | 2/2015 | Vora | H04M 1/64 455/412.2 |
| 2015/0163352 | A1* | 6/2015 | Ritter | H04W 4/90 455/404.1 |
| 2015/0181023 | A1* | 6/2015 | Citron | H04M 3/42059 379/207.02 |
| 2016/0065711 | A1* | 3/2016 | De Carney | H04M 1/642 455/412.1 |
| 2016/0330596 | A1* | 11/2016 | Jawaharlal | H04W 4/12 |
| 2019/0007552 | A1* | 1/2019 | James | H04M 3/42059 |

* cited by examiner

APPARATUS AND METHOD FOR MANAGING COMMUNICATIONS

BACKGROUND OF THE INVENTION

1. The Field of the Invention

In its most general aspect, the present invention relates to an apparatus and a method for managing communications in a telecommunication network; in particular, for managing phone calls when the called terminal is unavailable, i.e. when it is off, outside mobile network coverage, or unreachable (e.g., due to network roaming issues, incoming-call policies set by the user of the called terminal, or the like).

2. The Relevant Technology

It is known that mobile network roaming conditions vary from country to country: each mobile operator has different rates for each service provided, in particular for data traffic; hence, a mobile terminal may experience problems of Internet connection availability when its user tries to access to data services in a foreign country, i.e., in a country in which it is necessary to use roaming. Problems may occur for different reasons: no roaming agreements between network operators, incorrect terminal configuration (e.g., wrong APN selected), run-out of credit in a very short period of time due to very high data roaming rates, etc. This reduces the availability, especially during a trip in a foreign country, of IP-based communication services like email, instant messaging (e.g., Messenger©, WhatsApp©, or the like), Voice over IP (e.g., Skype®, Viber©, or the like), etc.; in fact, these application cannot properly work without a stable IP data connection, by making it difficult to reach the owner/user of the mobile terminal.

On the contrary, voice roaming is almost always available, by making it possible to reach people all around the world through mobile phones. For this reason, it is commonly recognized that a phone call, in particular a phone call directed to mobile terminals, is the most effective way to reach a person, especially when he/she is on a business trip or a vacation. In fact, during a business or leisure trip, it may be necessary to be reached by other people (e.g., colleagues, collaborators, relatives, etc.) via mobile phone, in order to receive updates about situations of interest, e.g., business evolution, dangerous situations occurring in your home country, or the like. But, during a trip, it is not always possible to be available due to a number of reasons, e.g., the mobile phones must be switched off on almost all the airplanes and/or during immigration/customs checks, the mobile phones are usually switched off or put in a silent mode during the night in order to avoid harassing phone calls from countries in different time zones, etc. This makes the users very prone to miss phone calls; hence, said users very often use voicemail services (also called answering machine services) provided by the network operators.

The U.S. Pat. No. 8,831,574 by FRANCE TELECOM describes a solution for personalizing the unavailability message of the voicemail service heard by the caller, wherein these messages are generated on the basis of information provided by the user (owner) of the voicemail (i.e., the user of the called terminal), the caller phone number (e.g., the MSISDN number), the called user position, or the like. This solution does not solve the problem of reducing the number of missed calls; in particular, it does not reduce the time spent listening all the voice messages or reading the missed-call alert (usually provided by Short Message Service—SMS), and it increases the missing opportunities. In fact, certain callers try to reach a particular called user a single time only and they never leave a message in a voicemail, e.g., a possible customer trying to contact a practitioner for the first time, embassy services trying to contact the largest number of nationals being in a specific area in the shortest time, or the like.

SUMMARY OF THE INVENTION

The present invention aims at solving these and other problems by providing an apparatus and a method for managing communications in a telecommunication network.

The main idea of the present invention is the generation of non-presence messages or configuration messages allowing the communication between the caller and the called user, not only on the basis of the called user context-dependent information (e.g., called user position, called phone number, or the like), but also on the basis of attempting information which is determined on the basis of data generated by the caller communication terminal during a communication attempt.

In this way, it possible to provide the right amount of information to the called user, i.e., avoiding that the called user misses important information/contacts or is overwhelmed by either voicemail messages or missed-call alert messages when he/she becomes available again. This is possible due to the fact that the attempting information is context-dependent, so that said information allows to take into the account the relationship between the called user and the caller at the (specific) moment of the call attempt, and not only at the moment in which the called user becomes (or decides to become) unavailable.

It is to be understood that the origin of the data generated by the caller communication terminal is not timely limited to just the period of time "during a communication attempt". Also data acquired before and/or short before the communication attempt may be considered as relevant to verify circumstances related to the calling user. For example movement data such as velocity or acceleration before the communication attempt are useful for deriving the situation of the calling user.

Further advantageous features of the present invention are the subject of the attached claims.

BRIEF DESCRIPTION OF THE DRAWINGS

The features of the invention are specifically set forth in the claims annexed to this description; such characteristics will be clearer from the following description of a preferred and non-exclusive embodiment shown in annexed drawings, wherein:

DETAILED DESCRIPTION OF THE PREFERRED EMBODIMENTS

In this description, any reference to "an embodiment" will indicate that a particular configuration, structure or feature described with regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
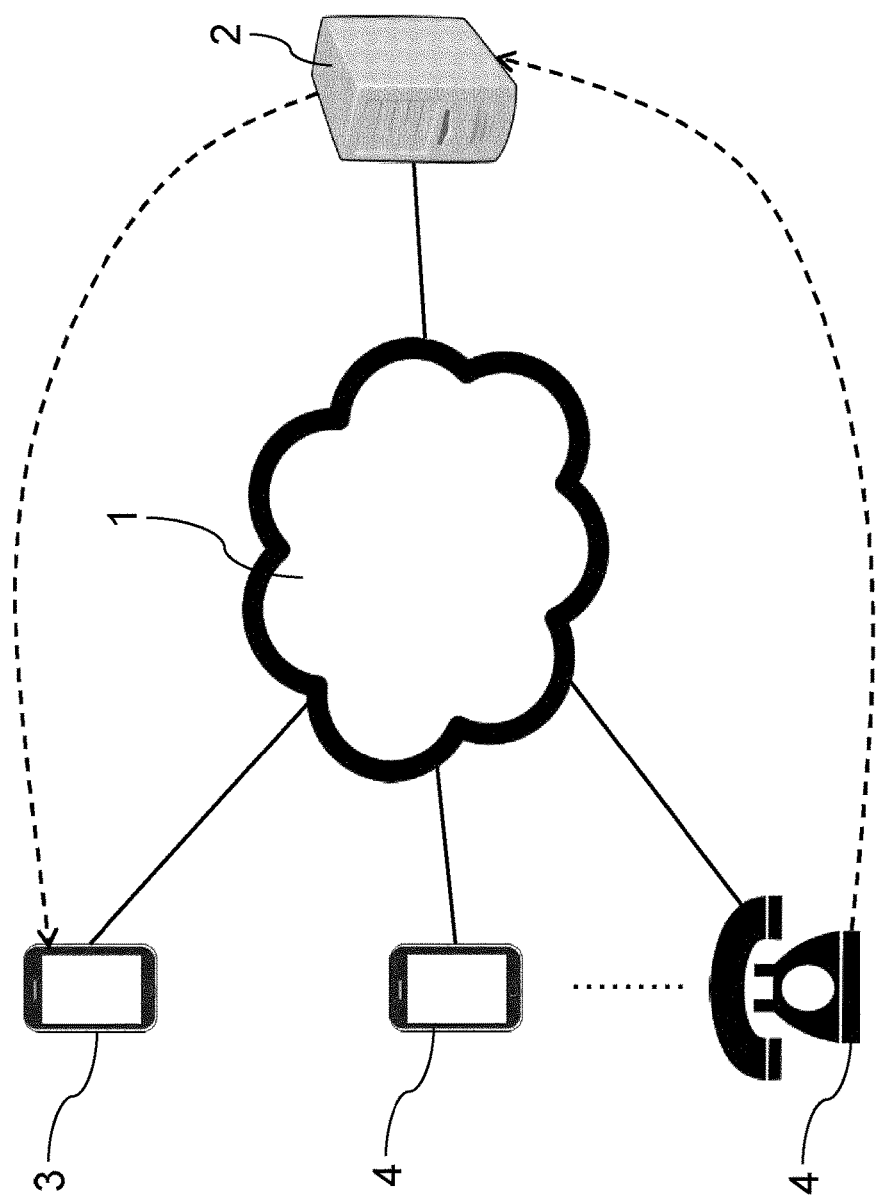
FIG. 1 shows a communication system comprising an apparatus for managing communications according to the invention.

FIG. 1 shows a communication system S (e.g., a circuit-switched telephone system) comprising the following parts:

a telecommunication network 1 (e.g., a circuit-switched and/or a packet-switched telephone network), which preferably dispatches phone calls and (optionally) packet data between the different nodes of said network 2;

a messaging server 2 configured for receiving signaling information and/or collecting/determining attempting information which will be better detailed in the following of this description; at least one called terminal 3 (e.g., a mobile phone), which can be unavailable, e.g., because said terminal has the mobile communication part off (the so-called "airplane-mode"), has been switched off by the user, is out of network coverage, is out of battery, has set a policy for blocking specific callers or group of, or the like;

one or more caller terminal 4 (e.g., a mobile or a landline terminal), which is adapted for trying to establish a communication between itself and said called terminal 3 through the telecommunication network 1 by using a signaling protocol (e.g., Session Initiation Protocol—SIP), i.e., a set of standardized procedures executed by the terminals 4 and the various network elements of the telecommunication network 1 (e.g., the messaging server 2) in order to provide the services requested by the caller (in this cases, said services preferably include at least the establishment of a voice communication between the caller terminal 4, which is requesting the communication, and the called terminal 3).

Figure 2:
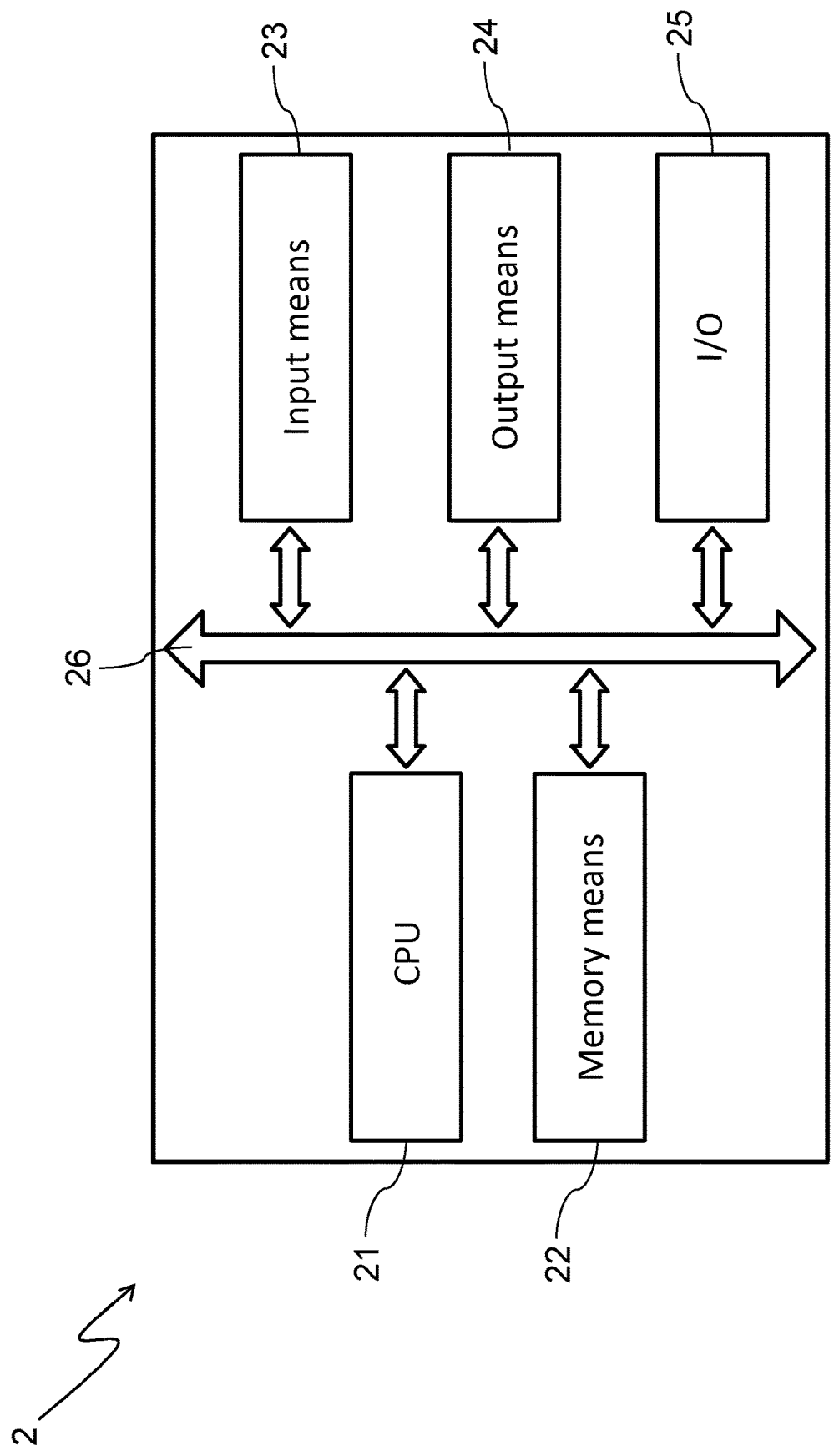
FIG. 2 shows a block diagram of the internal architecture of the apparatus for managing communications illustrated in FIG. 1.

With reference to FIG. 2, an apparatus 2 for managing communications in the telecommunication network 1 comprises the following parts:

processing means 21, like a Central Processing Unit (CPU), configured for executing a set of instruction for carrying out a method for managing communications in the telecommunication network 1 according to the invention (said method will be described in details in the following of this description);

memory means 22 containing at least message generation information allowing to determine which non-availability message have to be generated on the basis of the attempting information and (optionally) which of the terminals 3 is available or not, and preferably the instructions that implement the method for managing communications in the telecommunication network 1 according to the invention;

input means 23 (e.g., a network interface), which is adapted to receive, through the telecommunication network 1, signaling information from a caller communication terminal 4 that is trying to establish a connection with a called communication terminal 3 which is unavailable; such input means may for example include an adapter according to at least one of the following standards: Ethernet, USB, Firewire, Wi-Fi, or the like;

output means 24 (e.g., a network interface), which is adapted to deliver, through the telecommunication network 1, at least a non-availability message to the caller communication terminal 4 when the called communication terminal 3 is in an unavailable state, i.e., when the terminal 3 is unreachable and/or the user of said terminal 3 has inhibited said terminal 3 to accept communications from a particular caller or a group of callers; such output means may be similar to the input means 23, and may for example include an adapter according to at least one of the following standards: Ethernet, USB, Firewire, Wi-Fi, or the like;

I/O means 25, which can be used, for example, for updating the set of instruction for carrying out the method for managing communications according to the invention and/or checking the status of said apparatus 2 and/or servicing said apparatus 2; for this purpose, the I/O means 25 may comprise, for example, USB, Firewire, RS232, IEEE 1284, Ethernet, WiFi or other adapters;

a communication bus 26, which allows the exchange of information between the CPU 21, the memory means 22, the input means 23, the output means 24, and the I/O means 25.

The generation of information, which are used for generating messages, can be preferably defined from the called user by means of an SMS sent to the apparatus 2, a (Web) control dashboard configuring the apparatus 2, or the like. For this purpose, the apparatus 2 can preferably run a computer program implementing the functionalities of (Web) server that can be reached by any communication terminals 3,4 accessing the communication network 1 and/or Internet.

The method for managing communications according to the invention executed by the messaging server 2 comprises the following phases:

a. a receiving phase, wherein the signaling information is received, by means of the input means 23, from the caller communication terminal 4 that is trying to establish a connection with the called communication terminal 3 which is unavailable;

b. a determination phase, wherein the attempting information is determined, by means of the processing means 21, on the basis of the data generated by the caller communication terminal 4 during a communication attempt;

c. a generation phase, wherein a non-availability message or at least a configuration message allowing the communication between said caller and called communication terminals 3,4 is generated, by means of processing means 21, on the basis of the signaling information and the attempting information;

d. an output phase, wherein the non-availability message or the configuration message are outputted through the output means 24.

Figure 3:
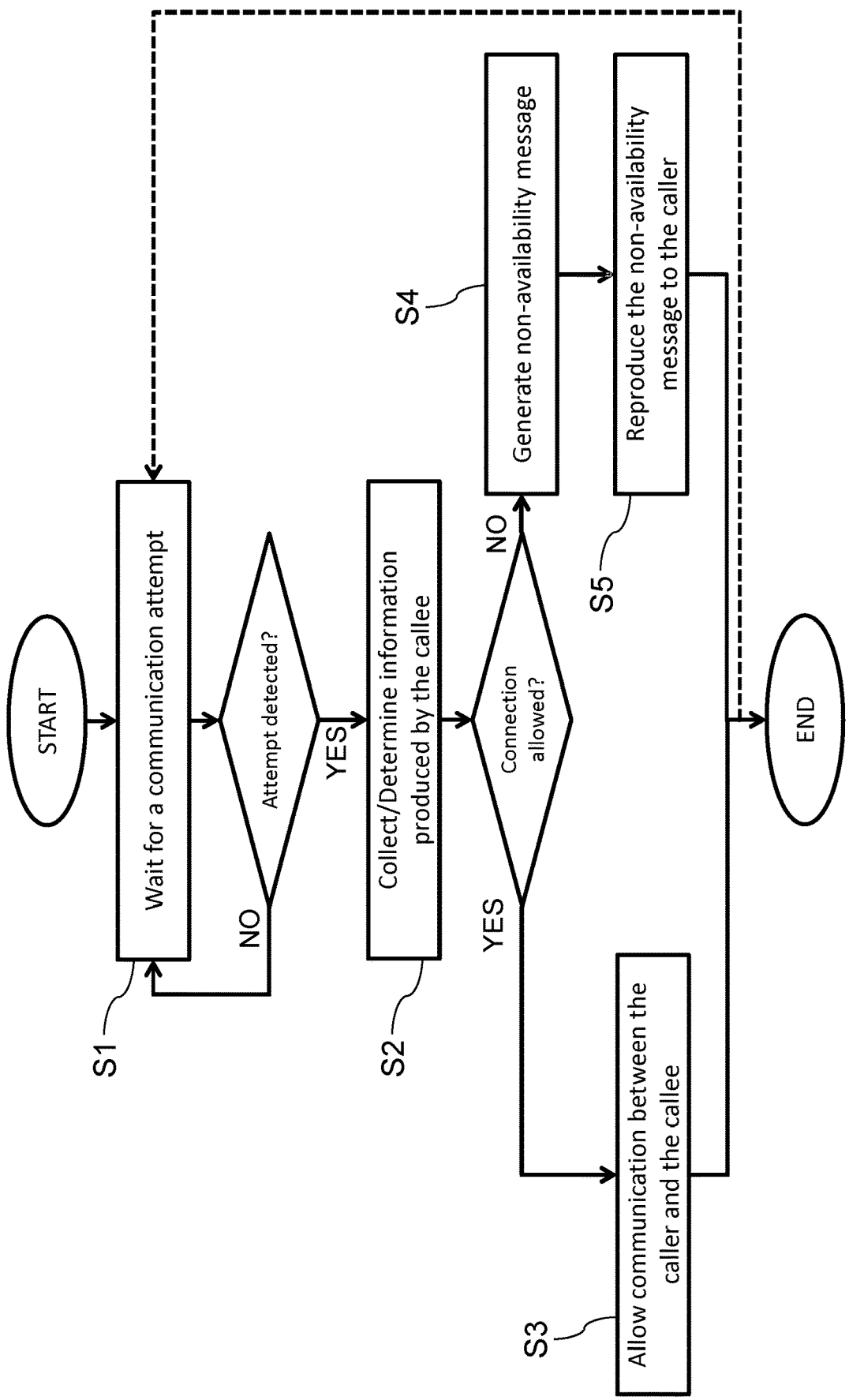
FIG. 3 shows a flow chart that shows the operation of the apparatus illustrated in FIGS. 1 and 2.

With also reference to FIG. 3, one possible mode of operation of the apparatus 2 according to the first embodiment of the invention is represented by means of a finite-state machine; said mode of operation can be implemented through software, e.g., the previously described program, which is then executed by the processing means 21 and/or by a programmable hardware component (e.g., a CPLD or a FPGA or the like) or a specially developed one. The finite-state machine comprises the following states:

a stand-by state S1, wherein the apparatus 2 waits to receive signaling information through the input means 23;

a determination state S2, wherein the apparatus 2 determines attempting information, i.e., it executes the phase b. of the previously described method;

a connection state S3, wherein the apparatus 2 generates one or more configuration messages, and outputs said message(s) in order to allow communication between the caller and the called terminal, i.e., it executes phases c. and d.;

a generation state S4, wherein the apparatus 2 generates a non-availability message, i.e., it executes phases c.;

a reproduction state S5, wherein the apparatus 2 sends the non-availability message to the caller terminal 4 (e.g., by playing the content of said messages to the caller), i.e., it executes phases d.

When the apparatus 2 is in operating condition, said apparatus 2 enters the state S1, where it stays until the input means 23 receives signaling information (phase a.), i.e., detect a communication attempt; when this happens, the machine enters the state S2. In the state S2, the computing means 21 determines whether a non-availability message or a configuration message should be generated, or whether the caller can directly communicate with the callee; in case the computing means 21 determine that the caller can directly communicate with the called user, the apparatus 2 enters in state S3, and otherwise it enters in state S4. After a non-availability message is generated (state S4), the apparatus 2 enters in state S5, so that said message is sent to the caller.

After the apparatus 2 has either allowed the communication between the caller and the called user or sent the non-availability message to the caller, the apparatus 2 will end its operation or, as highlighted by the dashed lines in FIG. 3, will enter again the state S1, ready for a new operating cycle.

The attempting information is generated by collecting and/or determining caller information during the phone call attempt. More in details, the attempting information may comprise the number of call attempts in a (predetermined) time interval, i.e., the caller calling frequency. In order to generate this attempting information, the processing means 21 are configured for computing said caller calling frequency during the call attempt on the basis of the previous calls data (i.e., the call history) and preferably also on the basis of the caller phone number (e.g., the MSISDN number), which can be retrieved from the signaling information. In other words, the processing means 21 are configured for generating attempting information on the basis of a number of call attempts made by a specific caller terminal 4 in a time interval.

In this way, it is possible to determine attempting information that is representative of the needs of the caller, i.e., said attempting information allows estimating whether a caller has a desperate need to directly communicate with the called user. For example, if a caller tries to recall the called user 5 times in a time interval of 20-30 minutes, it means that said caller needs urgently to communicate with the called user, so said caller can be allowed by the apparatus 2 to communicate directly with the called without listening/receiving any non-availability messages.

Alternatively or in combination with that, the attempting information may comprise background information describing the physical place in which the caller is (e.g., emergency control room, first aid station, home, public place, disco, etc.). In order to generate/determine this attempting information, the processing means 21 are configured for collecting a recording (preferably an audio recording) including several seconds (e.g., 5 seconds) of the audio stream produced by the called communication terminal 4 during the communication attempt, i.e., the audio signal picked up by microphone of the terminal 4 during the communication attempt, and determining the background information on the basis of said recoding. For determining said background information, the computing means 21 may be configured for executing a set of instructions implementing the steps of an audio context recognition algorithm, so that the apparatus 2 may estimate the context in which the caller is, and decide whether the caller should be allowed or not to (directly) communicate with the called user. In fact, places like emergency control room, first aid waiting rooms, discos, or the like have a very specific background noise that produces a strong audio "fingerprint" by making it possible to recognize whether the caller is in a context generating "strong communication needs"; in particular, the background noise of an emergency control room is characterized by the presence of noise generated by other operators talking excitedly and/or by radio communications (e.g., white or pink noise generated by the opening/closing of the radio squelch, roger-beep ending radio communications, or the like), the background noise of a first aid station is characterized by presence of the ambulance siren tone and/or the noise produced by the wheels of the stretchers or the wheelchairs pushed around, whereas the background of a disco can be distinguished by the presence of loud music.

In this way, it is possible to enable the communication between a called user and a caller calling from an emergency context, ensuring that the called user receives the correct level of information, since a phone call coming from a first aid station will success, whereas a phone call coming from a disco, probably attempted accidentally, will fail and a non-availability message will be sent to the caller (it is not possible to talk on the phone from a too loud environment like a disco).

Alternatively or in combination with the previously described features, the attempting information may comprise acceleration information describing the physical situation from which the caller terminal 4 is attempting to establish a connection, wherein said acceleration information is generated based on acceleration data produced by at least an accelerometer comprised in the caller terminal 4. More in details, the processing means 21 may be configured for performing the following steps:

reading data produced by the accelerometer;

determining the acceleration information on the basis of said data, wherein said acceleration information describe the dynamical status of the caller terminal 4, i.e., whether the terminal 4 is held by a person who is driving, walking, sitting, or has recently experienced a high acceleration (e.g., due to a car accident, a fall, or the like).

Furthermore, the caller communication terminal 4 is configured for collecting acceleration data produced by the accelerometer, and sending at least part of said acceleration data to the apparatus 2 through the telecommunication network 1. It is clear that according to the present invention said data may be in general any kind of parameters about physical quantities that can be processed to derive information about the state of movement of the caller. In addition it is to be understood that the physical parameters may be acceleration, velocity and/or movement patterns providing information about an specific kind of movement such as walking, running, driving, cycling, going by train, car driving, flying or the like. In addition the acquisition and collection of the aforesaid information is not limited to the time window during the communication attempt, so that also relevant time periods before the communication attempt may also be considered for providing information about the movement status of the caller or an stationary status.

In this way, it is possible to enable the communication between a caller and a called user only if the caller is in a particular dynamical situation, e.g., is sitting, in order to avoid dangerous and/or useless situations (having a phone call when driving can be dangerous). In case the calling user has recently experienced a high acceleration, the communication between a called user and a caller calling can be enabled, so that the caller can communicate his/her real status to the called user.

The non-availability message produced in the generation phase c. can be generated also on the basis of status information retrieved from an alternative information source providing information about the called user, e.g., a social network profile (like Facebook©, Twitter©, etc.) or the like. More in details, the computing means 21 can be configured for retrieving, during the generation phase c., status information associated to the called user from the Internet, preferably from a social network profile associated to the called user, and generating non-availability messages also on the basis of said status information.

For example, if a person is in USA and publishes on his Facebook© profile the message 'I just arrived at my hotel', Facebook may attach to this message the position information (e.g., the string "New York, USA"). When a caller tries to contact this person and said person results unavailable to this caller, the computing means 21 can retrieve the Facebook® status and generate a non-availability message like "I am in New York, USA. Please leave a message after the signal".

In this way, it is possible to provide the proper level of information to the caller, because the caller is informed of the current conditions (e.g., the location) of the called user, so he or she can decide if it is useful or not leaving a message in the voice mail.

Alternatively or in combination with the above-described feature, the non-availability message produced in the generation phase c. can also be generated in a way to allow contacting the called user in an alternative manner, e.g., via VoIP or the like. More in details, the non-availability message can contain audio routing information defining the alternative way (manner) in which the called user can be contacted. Said audio routing information can be generated by the computing means 21 on the basis of the status information and/or defined from the called user by means of an SMS sent to the apparatus 2, a (Web) control dashboard configuring the apparatus 2, or the like.

The audio routing information can be vocal instructions telling the caller how to contact the called user (e.g., the VoIP provider used by the called user and the caller's VoIP identification code).

Alternatively, the audio routing information can be an audio signal, which is encoded by using preferably a digital encoding standard, and contains the information for contacting the called user in an alternative way, so that the caller can (automatically or semi-automatically) receive the audio signal, decode said audio signal in order to extract the audio routing information, and trying to connect with the called user on the basis of said audio routing information.

For example, if a user wants to be contacted by a certain caller only via Skype©, said user can configure the apparatus 2 (by means of an SMS, a web dashboard, or the like) to generate audio routing information, encoded by means of a digital encoder, containing his/her Skype ID and specifying that he/she wants to be contacted on Skype®; in this way, when a caller tries to communicate with said user, the caller terminal 4 receives audio routing information, decodes said audio routing information getting the Skype ID and the user's wish to be contacted on Skype© only, and contacts said user (the called user) through Skype© by using the caller's Skype ID.

In this way, it is possible to provide the proper level of information to the caller by giving the caller an alternative way to contact the called user, so that no voice mail message should be left. Furthermore, advantageously this solution does not result influenced by the setting used by the different telecommunication operators all over the world, since the audio routing information is encoded in an audio signal which can be sent across any phone line without limitations. In an alternative and advantageous manner according to the present invention the audio routing information may be created based on a text provided by the called user. The aforementioned text is than transformed to an audio file using a text to audio/voice algorithm. It is also possible to transform the text to an audio file which is just understandable by a machine or decodable by the calling apparatus. In this way, the calling apparatus is able to receive the audio routing information and transform the audio file into text by means of a predefined algorithm while avoiding the risk of buggy speech to text algorithms.

In this way, the correct transmission of an alternative way for contacting the callee is ensured.

Alternatively or in combination with that, the attempting information may comprise or consider data derived from a calendar, in particular from a calendar of the calling user. In this way it is possible to determine the status of the calling user in accordance with events comprising in the calendar. These events may be time and duration of meetings, place of meetings, urgency level of meetings and the like. The calendar may also be originated from the calendar of a company comprising information about the availability of certain employees.

In a second embodiment of the present invention, all the phases of the method according to the invention are performed by a mobile terminal or a landline phone terminal (e.g., a PABX, an IP phone, or the like); hence, the messaging server 2 of the previous embodiment is no more necessary because all its operations can be performed by the caller communication terminal. Said terminal is configured for executing a software implementing all the phases of the method according to the invention; the set of instructions of said software can be stored into the memory of said terminal by the manufacturer, or can be downloaded from a server via a communication network (e.g., by downloading through Internet an application from an online shop, such as Google Play, App Store, or the like) and then stored/installed in the memory of said terminal.

When the called terminal is in an operating condition and executes the phase a., the called terminal receives the signaling information from a base station, wherein said signaling information comprises the caller ID or the like; in addition to that, when the called terminal has generated during the phase c. at least a configuration message allowing the communication between the caller and the called user, said configuration message is outputted during the output phase d. (e.g., by writing in the mobile phone memory the result of the execution of a computerized procedure) in a way that the mobile terminal alerts its user that there is an incoming call (e.g., by emitting a ringtone, a vibration, or the like).

In this way, the called mobile terminal results completely independent from the operator networks, so that the proper quantity of information is always provided to the called user independently by the setting of the communication network (voicemail number, APN address, etc.), which may vary from country to country.

In the two previously described embodiments, the communication network is a public mobile and/or landline phone network, whereas the called/caller communication terminals are mobile or landline terminals; it is evidenced that this invention can be also applied to fully packet-switched communication networks (e.g., public Internet, private data network, or the like) and to Voice over IP (VoIP) terminals (e.g., Personal Computer, tablet, smartphone, or the like) that may run a software (e.g., Skype©, Google Hangouts©, or the like) implementing communication terminal functionalities.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for managing communications in a telecommunication network, comprising
   input means adapted to receive signaling information from a caller communication terminal that is trying to establish a connection with a called communication terminal which is unavailable,
   output means adapted to send at least a non-availability message to the caller communication terminal,
   processing means in signal communication with said input means and said output means, wherein said processing means are configured for:
      determining attempting information on the basis of data generated by the caller communication terminal during a communication attempt, wherein the attempting information comprises background information describing a physical place from which the caller communication terminal is attempting to establish a connection, and wherein the processing means are configured for determining said background information on a basis of an audio stream produced by the caller communication terminal during the communication attempt, and
      generating, on the basis of the signaling information and the attempting information, the non-availability message or a configuration message allowing the communication between said caller and called communication terminals.

2. The apparatus according to claim 1, wherein the processing means are configured for generating attempting information on the basis of a number of call attempts made by a specific caller terminal in a time interval.

3. The apparatus according to claim 1, wherein said processing means are configured for generating the non-availability message also on the basis of a called user status retrieved from an alternative information source providing information about the called user.

4. The apparatus according to claim 3, wherein the alternative information source comprises a social network profile.

5. The apparatus according to claim 1, wherein attempting information comprises acceleration information, velocity information and/or movement information describing the physical situation from which the caller terminal is attempting to establish a connection, and wherein the processing means are configured for determining said acceleration information, velocity information and/or movement information on the basis of movement data produced by said caller terminal during and/or before the communication attempt.

6. The apparatus according to claim 1, wherein the non-availability message comprises audio routing information providing information for contacting the called user in an alternative manner, wherein said audio routing information is encoded in an audio signal by means of an encoder.

7. The apparatus according to claim 1, wherein the connection is unavailable when a voice call is not completed, wherein the configuration message identifies an alternative communication method.

8. The apparatus according to claim 7, wherein the configuration message comprises a mobile terminal alert, a ringtone or a vibration that alerts the called communication terminal that there is an incoming call from a caller communication terminal.

9. A communication system comprising:
   an apparatus that includes
      input means adapted to receive signaling information from a caller communication terminal that is trying to establish a connection with a called communication terminal which is unavailable,
      output means adapted to send at least a non-availability message to the caller communication terminal,
      processing means in signal communication with said input means and said output means, wherein said processing means are configured for:
         determining attempting information on the basis of data generated by the caller communication terminal during a communication attempt, wherein the attempting information comprises background information describing a physical place from which the caller communication terminal is attempting to establish a connection, and wherein the processing means are configured for determining said background information on a basis of an audio stream produced by the caller communication terminal during the communication attempt, and
         generating, on the basis of the signaling information and the attempting information, the non-availability message or a configuration message allowing the communication between said caller and called communication terminals;
   a telecommunication network, and a caller communication terminal comprising an accelerometer, wherein said caller communication terminal is configured for collecting acceleration data produced by the accelerometer or movement data, and sending at least part of said acceleration data or said movement data to the apparatus through the telecommunication network.

10. The communication system according to claim 9, wherein the apparatus, when it tries to connect with a called communication terminal resulting unavailable, is configured for receiving the audio signal through the telecommunication network, decoding said audio signal in order to extract the audio routing information, and trying to connect with a called user on the basis of said audio routing information.

11. A mobile or landline terminal comprising an apparatus according to claim 1.

12. A method for managing communications in a telecommunication network, comprising:
   a receiving phase, wherein signaling information is received, by means of input means, from a caller communication terminal that is trying to establish a connection with a called communication terminal which is unavailable,
   a determination phase, wherein attempting information is determined, by means of processing means, on the basis of data generated by the caller communication terminal during a communication attempt, wherein the attempting information comprises background information describing a physical place from which the caller communication terminal is attempting to establish the connection, and wherein said background information is determined, by the processing means, during the determination phase on a basis of an audio stream produced by the caller communication terminal during the communication attempt, a generation phase, wherein a non-availability message or at least a configuration message allowing the communication between said caller and called communication terminals is generated, by means of processing means, on the basis of the signaling information and the attempting information, an output phase, wherein the non-availability message or the configuration message is outputted through output means.

13. The method according to claim 12, wherein, during the determination phase, the attempting information is determined, by means of the processing means, on the basis of a number of call attempts made by an specific caller terminal in a time interval.

14. The method according to claim 12, wherein, during the generation phase, the non-availability message is generated, by means of the processing means, also on the basis of a called status retrieved from an alternative information source providing information about the called user.

15. The method according to claim 14, wherein the alternative information source comprises a social network profile.

16. The method according to claim 12, wherein attempting information comprises acceleration information, velocity information and/or movement information describing the physical situation from which the caller terminal is attempting to establish a connection, and wherein said acceleration information, velocity information and/or movement information is determined, by means of the processing means, during the determination phase on the basis of acceleration data or movement data produced by said caller terminal during and/or before the communication attempt.

17. The method according to claim 12, wherein the non-availability message comprises audio routing information providing information for contacting the called user in an alternative way, and wherein said audio routing information is encoded, by means of an encoder, in an audio signal during the generation phase.

18. A non-transitory computer readable medium comprising portions of software code for executing the method according to claim 12.

19. A mobile or landline terminal comprising:
an apparatus including:
input means adapted to receive signaling information from a caller communication terminal that is trying to establish a connection with a called communication terminal which is unavailable,
output means adapted to send at least a non-availability message to the caller communication terminal,
processing means in signal communication with said input means and said output means, wherein said processing means are configured for:
determining attempting information on the basis of data generated by the caller communication terminal during a communication attempt, wherein the attempting information comprises background information describing a physical place from which the caller communication terminal is attempting to establish a connection, and wherein the processing means are configured for determining said background information on a basis of an audio stream produced by the caller communication terminal during the communication attempt, and
generating, on the basis of the signaling information and the attempting information, the non-availability message or a configuration message allowing the communication between said caller and called communication terminals,
wherein the apparatus is adapted to activate provision of predefined non-availability messages on said apparatus for said called user in case of non-availability, wherein said activation is performed by means of a menu for inputting or selecting non-availability messages on said mobile or landline terminal.

20. A mobile or landline terminal comprising a software application configured to perform a method that includes:
a receiving phase, wherein signaling information is received, by means of input means, from a caller communication terminal that is trying to establish a connection with a called communication terminal which is unavailable,
a determination phase, wherein attempting information is determined, by means of processing means, on the basis of data generated by the caller communication terminal during a communication attempt, wherein the attempting information comprises background information describing a physical place from which the caller communication terminal is attempting to establish the connection, and wherein said background information is determined, by the processing means, during the determination phase on a basis of an audio stream produced by the caller communication terminal during the communication attempt,
a generation phase, wherein a non-availability message or at least a configuration message allowing the communication between said caller and called communication terminals is generated, by means of processing means, on the basis of the signaling information and the attempting information,
an output phase, wherein the non-availability message or the configuration message is outputted through output means.

21. A method for managing communications in a telecommunication network, comprising:
a receiving phase, wherein signaling information is received, by means of input means, from a caller communication terminal that is trying to establish a connection with a called communication terminal,
a determination phase, wherein attempting information is determined, by means of processing means, on the basis of data generated by the caller communication terminal during a communication attempt, wherein the attempting information comprises background information describing a physical place from which the caller communication terminal is attempting to establish the connection, and wherein said background information is determined, by the processing means, during the determination phase on a basis of an audio stream produced by the caller communication terminal during the communication attempt,
a generation phase, wherein a configuration message allowing the communication between said caller and called communication terminals is generated, by means of processing means, on the basis of the signaling information and the attempting information, an output phase, wherein the configuration message is outputted through output means.

\* \* \* \* \*